United States Patent
Lyon

[15] 3,661,180
[45] May 9, 1972

[54] ANTIFRICTION LINER FOR CERAMIC VALVE PLATES OF SINGLE-HANDLED MIXING VALVE

[72] Inventor: John K. Lyon, Pasadena, Calif.

[73] Assignee: Price-Pfister Brass Mfg. Co., Pacoima, Calif.

[22] Filed: Aug. 31, 1970

[21] Appl. No.: 68,075

[52] U.S. Cl.....................137/625.17, 137/636.3
[51] Int. Cl............................................F16k 19/00
[58] Field of Search............137/625.17, 636.2, 636.3, 636.4

[56] References Cited

UNITED STATES PATENTS

| 3,324,884 | 6/1967 | Dornaus | 137/625.17 |
| 3,533,436 | 10/1970 | Parkison | 137/636.3 X |
| 3,533,444 | 10/1970 | Lyon | 137/625.17 |

Primary Examiner—William R. Cline
Attorney—Flam and Flam

[57] ABSTRACT

A ceramic valve plate is provided with a plastic liner cap that cooperates first, with the operating arm so as to minimize contact pressure and second, with a plastic back bearing so as to minimize sliding friction. The operating arm carries a cylindrical cross bar that fits into the recess of the valve plate lined by flanges of the liner cap.

3 Claims, 8 Drawing Figures

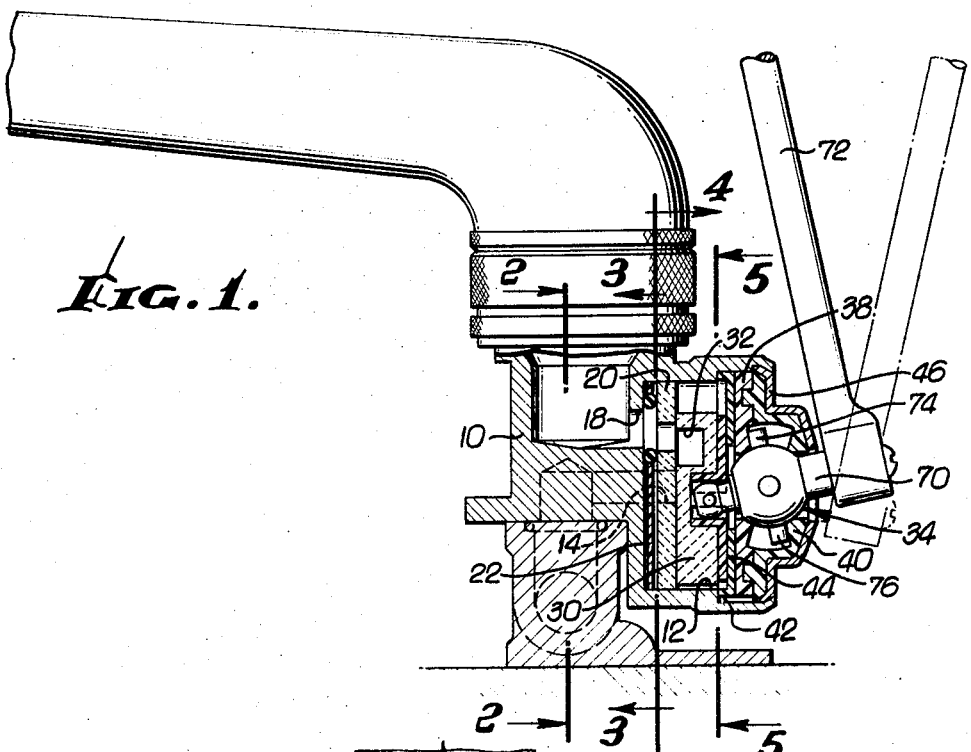
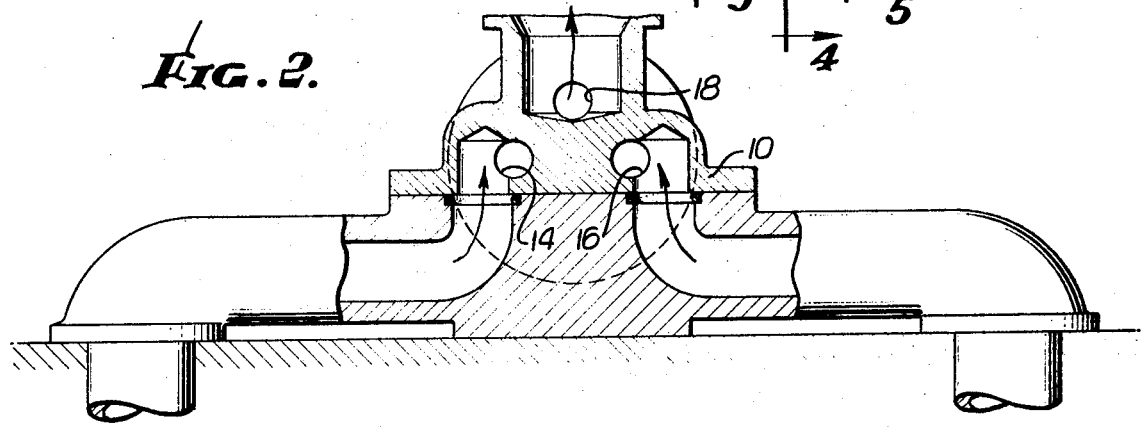
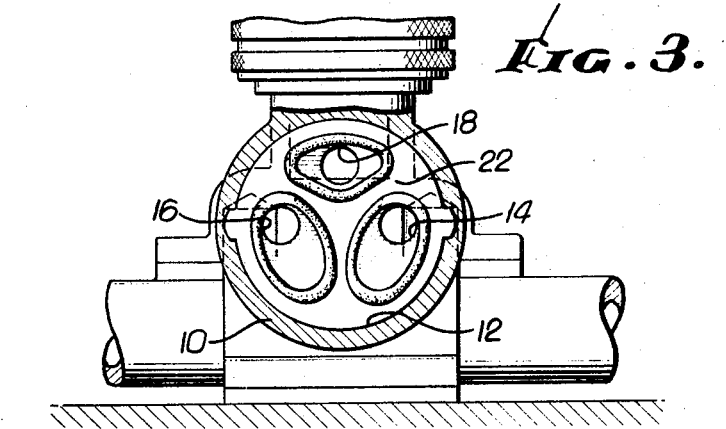

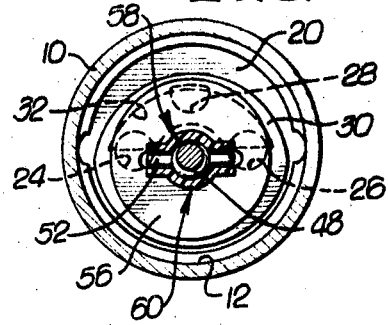
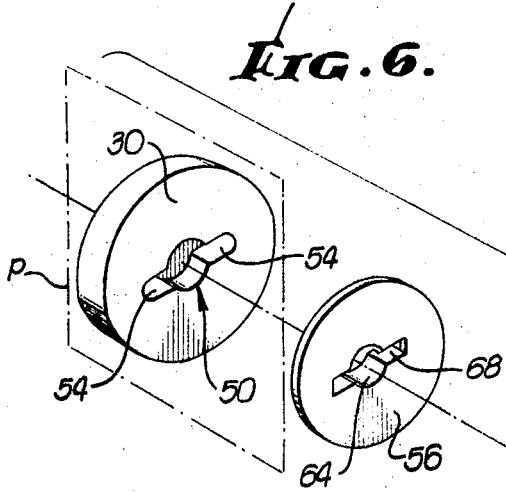
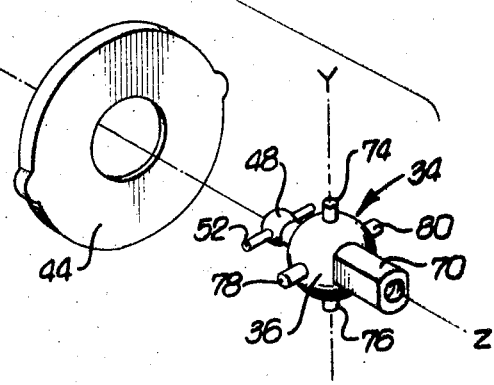
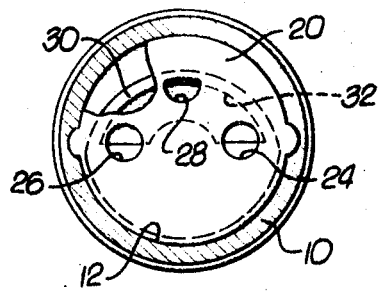
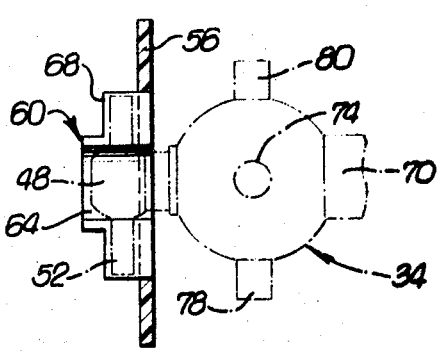
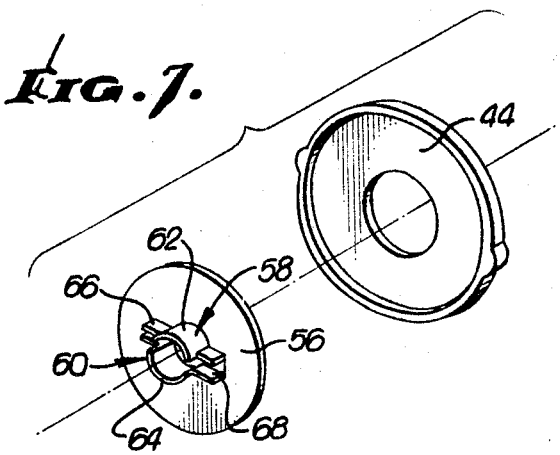
INVENTOR.
JOHN K. LYON

ANTIFRICTION LINER FOR CERAMIC VALVE PLATES OF SINGLE-HANDLED MIXING VALVE

FIELD OF INVENTION

This invention relates to plumbing fixtures providing hot and cold water service for sinks, lavatories, laundry trays and the like. More particularly, this invention relates to single-handled mixing valves incorporated in such fixtures and specifically to mixing valves of the type shown in Dornaus U.S. Pat. No. 3,324,884 in which ceramic valve plates are utilized.

BACKGROUND OF THE INVENTION

Ceramic plates incorporated in such mixing valves, and as noted in said Dornaus patent, are brittle and frangible. The fit between the operating arm and the recess of the valve plate deteriorates due to wear. The particular tracks and guides shown and described in said Dornaus patent largely prevent impacts or shock loads from rapidly deteriorating the fit. Nevertheless, the valve is intended to operate without replacement for a very large number of cycles —perhaps of the order of a million.

Gradual deterioration of the fit between the valve plate recess and its operating arm nevertheless occurs. Consequently, a certain play may come into existence, making accurate control of mixture and/or volume difficult. Gradual deterioration of the thickness of the valve plate may within limits be compensated by resilient seal rings; but excess deterioration results in leakage. Wear on that face of the valve plate which engages the seat is inherent and desirable so that, by a grinding process, the fit becomes progressively better. However, wear on the other face has no value.

The primary object of this invention is to reduce the wear of the ceramic.

SUMMARY OF THE INVENTION

In order to accomplish the foregoing objectives, I provide a plastic liner cap for the back of the ceramic valve plate together with a coupling between the operating arm and the valve plate that by its nature minimizes the contact pressure. The valve plate is provided with a generally rectangular elongated recess lined on opposite sides by ledges projecting from the liner cap. The operating arm carries a cylindrical bar that fits into the elongated recess. Contact pressure for shifting the valve plate radially is distributed along the length of the cylindrical bar and hence minimized. The force for angularly moving the valve plate is applied at the ends of the recess, thus minimizing the pressure necessary to develop the turning torque. A plastic back bearing provides a plastic-to-plastic contact at the back of the ceramic valve plate, thus minimizing wear and ensuring smooth, effortless movement.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is a partial vertical sectional view of a faucet construction incorporating the present invention.

FIG. 2 is a partial sectional view taken along the plane corresponding to line 2—2 of FIG. 1.

FIGS. 3, 4 and 5 are sectional views taken along planes corresponding to lines 3—3, 4—4 and 5—5 of FIG. 1.

FIG. 6 is an exploded pictorial view showing the movable ceramic valve plate, the plastic cap, the plastic back bearing and the operating arm.

FIG. 7 is an exploded pictorial view showing the plastic cap and the plastic back bearing from the side opposite that shown in FIG. 6.

FIG. 8 is an enlarged sectional view showing the connection between the operating arm and the flanges of the plastic cap for the ceramic valve plate.

DETAILED DESCRIPTION

The following detailed description is of the best presently contemplated mode of carrying out the invention. This description is not to be taken in a limiting sense but is made merely for the purpose of illustrating the general principles of the invention since the scope of the invention is best defined by the appended claims.

Structural and operational characteristics of the single-handled valve structure shown in Dornaus U.S. Pat. No. 3,324,884 shall be understood as being attributed to the invention hereinafter described unless such characteristics are obviously inapplicable or unless specific exception is made. The disclosure of said Dornaus patent is incorporated herein by reference.

The valve body 10 has a rearwardly extending, generally cylindrical recess 12 forming a mixing chamber for hot and cold water. The bottom wall of the recess 12 has hot and cold water inlet openings 14 and 16 (FIG. 3) and an outlet opening 18. A ceramic valve seat 20 (FIGS. 1 and 4) fits in the bottom of the recess, with a composite seal structure 22 (FIG. 3) interposed.

The outwardly facing surface of the ceramic valve seat 20 is accurately ground to flatness. Opening at this outer surface of the valve seat 20 are inlet ports 24 and 26 (FIG. 5) and an outlet port 28, all respectively registering, via the composite seal structure, with the inlet openings 14 and 16 and the outlet opening 18 of the valve body 10. Cooperable with the outer surface of the ceramic valve seat 20 is a ceramic valve plate 30. The inwardly facing surface of the ceramic valve plate 30 has an arcuate recess 32 (FIGS. 1 and 4) registrable with the inlet ports 24 and 26 as well as the outlet port 28 of the valve seat 20.

By shifting the valve plate 30 in a circular or radial coordinate system, the desired mixture of hot and cold water is caused to flow to the outlet. Angular shifting movement of the valve plate 30 about the central axis of the recess 12 adjusts the proportion of hot and cold water; radial shifting movement of the valve plate 30 adjusts the combined flow. Shifting movement of the valve plate 30 is accomplished by an operating arm 34.

The operating arm 34 has a central ball part 36 supported centrally at the outer end of the recess 12 by the aid of an inner ball seat part 38 and a companion outer ball seat part 40. The ball seat parts 38 and 40 are held against an outwardly facing intermediate shoulder 42 in the recess 12. A plastic back bearing 44 is interposed between the shoulder 42 and the inner ball seat part 38. The three parts 38, 40 and 42 are held in place by a closure 46.

The operating arm 34 has a ball-like projection 48 (FIGS. 6 and 8) that extends through central openings in the inner ball seat part 38 and the back bearing 44. It enters the central cylindrical part of a cross slot 50 located at the back of the valve plate 30. The ball projection 48 has a crosspin 52 the ends of which are accommodated in slot ends 54. Movement of the operating arm 34 imparts movement to the valve plate 30 in a manner to be described more fully hereinafter.

Fitted on the back of the valve plate 30 is a generally flat molded plastic liner cap 56. As shown most clearly in FIG. 7, the liner cap 56 has two inwardly extending spaced flanges 58 and 60 formed to fit the opposite sides of the valve plate slot 50. Thus each flange 58 and 60 has a central semicylindrical part 62 and 64 that lines the cylindrical central part of the slot 50. The flanges 58 and 60 have tabs 66 and 68 extending laterally from the ends of the semicylindrical parts to fit along the slot ends 54. The crosspin 52 accordingly transmits thrust to the valve plate 30 through the plastic liner cap 56. Abrasion of the ceramic is prevented. The thickness of the tabs 66 and 68 may be such as to cause them to be very slightly compressed by the crosspin 52. Slack is effectively eliminated.

The liner cap 56 slides along the inner surface of the back baring 44. The liner cap 56 and the back bearing 44 are preferably made of wear-resistant material, such as Teflon, having an extremely low coefficient of friction. Wear at this region is very slight as compared with the wear at the contacting ceramic surfaces on the opposite side.

The operating arm has a rearwardly projecting part 70 for connection to an operating handle 72.

The ball shaft 34 has a symmetry plane YZ perpendicular to the crosspin 52 and passing through the center of the ball part 36. Due to the fit of the crosspin 52 in the valve plate slot 54, the symmetry plane YZ must be coplanar with the symmetry plane $p$ of the valve plate 30, whatever the relative positions of the valve plate 30 and the ball shaft 34 may be. Hence, if the plane YZ of the ball shaft 34 is confined so that it always passes through the center axis of the cup, the same must hold true for the valve plate plane $p$.

The symmetry plane YZ is so confined by the aid of pins 74, 76, 78 and 80 projecting from the ball 36 and which cooperate with grooves formed by the ball seat parts 38 and 40 and in a manner more fully described in said Dornaus patent. The valve plate 30 is thus confined for movement in a circular or radial coordinate system so that each position of the handle 72 determines one and only one proportion and one and only one combined flow.

As the valve plate 30 is shifted, the crosspin 52 rolls between the tabs 66 and 68, the crosspin 52 transmitting the requisite thrust to cause shifting of the valve plate 30 in a radial direction. Upon angular movement of the ball shaft 34, the ends of the crosspin 52, operating through the flanges 58 and 60, transmit turning torque to the valve plate 30 at places located quite distant from the center of the valve plate 30. The contact pressure required to rotate the valve plate 30 accordingly is minimized.

A valve structure made in accordance with this invention has an exceedingly long life.

I claim:

1. In a mixing valve structure having wall means forming a valve recess, a ceramic valve seat in said recess and providing hot and cold water inlet ports opening in said recess, a frangible ceramic valve plate having a frontal surface slidable along said valve seat and having flow control recess means cooperable with said ports for determining the relative opening of said ports and the combined volume of flow therethrough, an operating arm for moving the valve plate, said arm having a ball part, means forming a socket for said ball part, means confining said arm for movement so that a plane fixed with respect to said arm includes the axis of said recess while said arm is tilted about its center and moved angularly about said axis, characterized by: said valve plate having a slot in its rear surface from said seat, said operating arm having a crosspin accommodated in said slot, said crosspin extending perpendicular to said plane, there being a plastic cap fitted on the valve plate and having flanges extending into the slot of said valve plate to be interposed between said crosspin and said slot of said valve plate whereby said ceramic valve plate is protected from abrasion and whereby the contact pressure between said operating arm and said valve plate is minimized when said valve plate is angularly moved.

2. The mixing valve as set forth in claim 1 together with a plastic bearing plate engaging said plastic cap, said plastic bearing plate and said plastic cap being made of wear-resistant low-friction material.

3. The mixing valve as set forth in claim 1 in which said flanges of said plastic cap are sized such as to be slightly compressed by said crosspin whereby said valve plate accurately and without lost motion follows the movement of said operating arm.

* * * * *